(12) United States Patent
Friedman et al.

(10) Patent No.: US 7,769,666 B2
(45) Date of Patent: Aug. 3, 2010

(54) METHOD AND SYSTEM FOR TRANSFER OF EMPLOYEE STOCK OPTIONS

(75) Inventors: Allen R. Friedman, Teaneck, NJ (US); Stephen E. Gray, Madison, NJ (US); Stephen L. Roti, Woodmere, NY (US); David A. Seaman, Short Hills, NJ (US); Benjamin B. Lopata, Forest Hills, NY (US); Kelly Cesare, New York, NY (US)

(73) Assignee: J.P. Morgan Chase Bank, New York, NY (US)

( * ) Notice: Subject to any disclaimer, the term of this patent is extended or adjusted under 35 U.S.C. 154(b) by 1206 days.

(21) Appl. No.: 10/666,979

(22) Filed: Sep. 17, 2003
(Under 37 CFR 1.47)

(65) Prior Publication Data

US 2004/0267656 A1      Dec. 30, 2004

Related U.S. Application Data

(60) Provisional application No. 60/483,486, filed on Jun. 27, 2003.

(51) Int. Cl.
*G06Q 40/00* (2006.01)
(52) U.S. Cl. .......................... 705/37; 705/35
(58) Field of Classification Search .............. 705/35–45
See application file for complete search history.

(56) References Cited

U.S. PATENT DOCUMENTS

| | | | |
|---|---|---|---|
| 6,269,346 B1 | 7/2001 | Cristofich et al. | |
| 6,567,790 B1 | 5/2003 | Slane | |
| 7,212,993 B1 * | 5/2007 | Bodurtha et al. | 705/35 |
| 7,337,141 B2 * | 2/2008 | Sullivan et al. | 705/37 |
| 7,353,200 B1 | 4/2008 | Brumberg | |
| 2001/0044770 A1 | 11/2001 | Keith | |
| 2001/0056391 A1 | 12/2001 | Schultz | |
| 2002/0010663 A1 * | 1/2002 | Muller | 705/30 |
| 2002/0032636 A1 | 3/2002 | Shields et al. | |
| 2002/0042771 A1 * | 4/2002 | Shields et al. | 705/37 |
| 2002/0116310 A1 * | 8/2002 | Cohen et al. | 705/36 |
| 2002/0133456 A1 * | 9/2002 | Lancaster et al. | 705/37 |
| 2002/0172349 A1 | 11/2002 | Shea | |
| 2002/0194136 A1 * | 12/2002 | Sullivan et al. | 705/64 |
| 2002/0198804 A1 * | 12/2002 | Calvin | 705/35 |
| 2004/0122759 A1 * | 6/2004 | Spivey | 705/36 |
| 2004/0138982 A1 | 7/2004 | Lawrence | |

(Continued)

OTHER PUBLICATIONS

Merrill Lynch & Co., Mandalay Resort Group, Floating Rate Convertible Senior Debentures due 2033; Offering Memorandum; Mar. 17, 2003.

(Continued)

*Primary Examiner*—Jagdish N Patel
*Assistant Examiner*—Kevin Poe
(74) *Attorney, Agent, or Firm*—Lowenstein Sandler PC

(57) ABSTRACT

A plurality of option value prices are determined for employee stock options. An average stock price corresponding to a particular one of the plurality of option value prices is determined. The employee stock option is exchanged for the value. The terms of the employee stock option are amended and the option is transferred to a third party in exchange for a value. The third party hedges the amended options.

21 Claims, 11 Drawing Sheets

U.S. PATENT DOCUMENTS

| | | | | |
|---|---|---|---|---|
| 2004/0172349 | A1* | 9/2004 | Quinn et al. | 705/35 |
| 2004/0199449 | A1* | 10/2004 | Rudkin | 705/36 |
| 2005/0004854 | A1* | 1/2005 | Jones et al. | 705/35 |
| 2005/0154751 | A1 | 7/2005 | Levi et al. | |
| 2005/0216384 | A1 | 9/2005 | Partlow et al. | |
| 2005/0240510 | A1 | 10/2005 | Schweickert et al. | |
| 2006/0020526 | A1 | 1/2006 | Viner | |
| 2006/0155621 | A1* | 7/2006 | Bell | 705/35 |
| 2008/0071667 | A1* | 3/2008 | Himmelstein | 705/37 |

OTHER PUBLICATIONS

Industry Issues Archive; SEC Adopts Proposals Regarding Exchanges and Alternative Trading Systems; http://www.ici.org/issues/mrkt/arc-sec/98_sec_ats_adopt.html; Dec. 28, 1998.

Cowan, Arnold, R., Nayar, Nandkumar, Singh, Ajai K.; How high are investment banking fees? The case of standby underwritten convertible calls; Oct. 1999; http://www.bus.iastate.edu/arnie.

Affiliated Managers Group, Inc.; $200,000,000 Floating Rate High premium and Warrant Convertible Securities due 2033; Offering Memorandum; LIBC Feb. 2003.

Merrill Lynch & Co.; $250,000,000 Affiliated Managers Group, Inc. Floating Rate Convertible Senior Debentures due 2033; Offering Memorandum; Feb. 19, 2003.

Hoadley, Peter; Options Strategy Analysis Tools; http://www.hoadley.net/options/bs.htm.

DerivativesStrategy; Delta Hedging Problems and Solutions; http://www.derivativesstrategy.com/magazine/archive/1998/0398coll.asp.

Hauser, James L., Journal of Compensation and Benefits; The Stock Option Repricing Dilemma; Nov./Dec. 2001.

Applications of random walkers to Stock Pricing, www.math.mit.edu/stocker/18354.d/financial.pdf; Spring 2004.

Transferable Stock Options: Compensation for the 21st Century, David A. Seaman, Workspan, May 2004, 47(5) pp. 64-71.

Transferable Stock Options: Microsoft's Program, Frederic W. Cook & Co., Inc. Oct. 31, 2003.

Transferable Stock Options (TSOs) and the Coming Revolution in Equity-Based Pay, Brian J. Hall, Journal of Applied Corporate Finance, Winter 2004 16(1).

Statement 133 Implementation Issues, No. A17, FASB, May 1, 2003.

Financial Accounting Series Statement of Financial Accounting Standards No. 123 (revised 2004), Financial Accounting Standards Board of the Financial Accounting Foundation, No. 263-C.

Menachem Brenner, Rangarajan K. Sundaram and David Yermack, Alterning the terms of executive stock options, 2000, Journal of Financial and Economics, 57, pp. 103-128.

J. Downes et al., Dictionary of Finance and Investment Terms, 1995, Barron's Educational Series, Inc., Fourth Edition, p. 19.

Agenda Items for the AEG Meetings, Feb. 2004-Nov. 2008.

List of Documents, First meeting of Advisory Expert Group on National Accounts, Washington, D.C., Feb. 16-20, 2004.

Proposal of 2002 OECD National Accounts Experts on Employee Stock Options.

Haveman et al., Employee Stock Options Become Transferable, Feb. 2007, Faegre & Benson.

CenterPoint Energy Form, S-3, as filed with the Securities and Exchange Commission on Apr. 16, 2004.

EUROSTAT, Employee Stock Options Paper for the Advisory Expert Group on national accounts, 2004, pp. 1-15.

Securities and Exchange Commission, Registration of Securities on Form S-8, Final Rule, 1999.

The Internal Revenue Service, Stock Based Compensation Audit Techniques Guide, 02/.

Transferable Option Developments—IRS Rules on Transferring Unvested Options, fwcook, Apr. 17, 1998.

Bagdonas et al., Managing a Stock Plan Restructuring, Global Equity Conference, 2004.

Microsoft, Form S-3, as filed with Securities and Exchange Commission on Sep. 16, 2003.

Microsoft Registration Agreement Exhibit (d)(1) Oct. 9, 2003.

Employee Stock Options in the EU and the USA, Final Report, Italy, Aug. 2002.

Stock Options Programs, Running a Business, Fact Sheet, ISA, Mar. 2009, pp. 1-3.

Taxation of Tradable Stock Options in Germany, Expatica, The Netherlands, Jul. 26, 2004.

Kallunki, Juha-Pekka et al., Should There Exist Secondary Markets for Executive Stock Options? Accounting and Finance, vol. 46, No. 2, pp. 265-283, Jun. 2006.

Kallunki, Juha-Pekka et al., Managers' Motives for Selling Executive Stock Options on Secondary Markets: A Study of The Unique Environment of Finland, Current Version: May 11, 2003.

Pirjeta, Antti, Helsinki School of Economics, Evaluation of Executive Stock Options in Continuous and Discrete Time, 2009.

Flannery, William et al., Global Equity Organization, From Switzerland to North America: Practical Consideration When Extending Share Plans to the U.S. and Beyond, Novartis Corporation, Fidelity Stock Plan Services 2006.

* cited by examiner

METHOD AND SYSTEM FOR TRANSFER OF EMPLOYEE STOCK OPTIONS

This application claims the benefit of U.S. Provisional Patent Application Ser. No. 60/483,486, filed Jun. 27, 2003, entitled METHOD AND SYSTEM FOR TRANSFER OF EMPLOYEE STOCK OPTIONS, the disclosure of which is incorporated herein by reference.

BACKGROUND

1. Field of the Invention

The invention relates to the field of securities and more particularly to the field of transferable employee stock options 2. Description of the Related Art Companies frequently issue employee stock options, however these options include restrictions on sale, transfer or hedging. These restrictions have an impact of the option value and the accuracy of known option pricing techniques.

What is needed is a method and system to provide for transfer of employee stock options to a buyer than can hedge.

The preceding description is not to be construed as an admission that any of the description is prior art relative to the present invention.

SUMMARY OF THE INVENTION

In one embodiment, the invention provides a method and system for transfer of employee stock options. The method comprises providing a plurality of option value prices; determining a stock trading price corresponding to a particular one of the plurality of option value prices; and receiving an employee stock option corresponding to the particular one of the plurality of option value prices. The method further comprises providing a value corresponding to the particular one of the plurality of option value prices in exchange for receiving the employee stock option; amending the employee stock option; transferring the amended stock option to a third party; and receiving a value corresponding to the amended stock option in exchange for transferring the amended stock option. In one embodiment of the invention, providing a plurality of option value prices uses an option pricing formula. In one embodiment of the invention, the option pricing formula is selected from the group consisting of Black-Scholes, binomial and trinomial methods. In one embodiment of the invention, providing the plurality of option value prices provides the plurality of prices in an option-price grid. In one embodiment of the invention, determining a stock trading price further comprises determining an average stock trading price over a predetermined period of time. In one embodiment, the invention further comprises providing a first value to an employee and providing a second value to the employee, where the first and second values are provided at different times. In one embodiment, the invention further comprises determining an investment value corresponding to the second value and providing the investment value to the employee with the second value. In one embodiment of the invention, amending the employee stock option comprises amending the maturity, or amending the number of shares per option, or amending the dilution protection, or amending the dividend protection. In one embodiment, the invention further comprises registering an offering of securities underlying the employee stock option. In one embodiment, the invention further comprises issuing the employee stock option. In one embodiment, the invention further comprises hedging the amended stock option. In one embodiment, the invention further comprises hedging the amended stock option by short selling of securities and/or futures contacts. In one embodiment of the invention, hedging the amended stock option includes buying and selling securities that underlie the option. In one embodiment of the invention hedging the amended stock option includes buying and selling of securities that underlie the option to rebalance the hedge position. In one embodiment of the invention, an issuer of the employee stock option receives the employee stock option and provides the value. In one embodiment of the invention, an issuer of the employee stock option amends the employee stock option, transfers the amended stock option and receives the value.

The foregoing specific objects and advantages of the invention are illustrative of those which can be achieved by the present invention and are not intended to be exhaustive or limiting of the possible advantages that can be realized. Thus, the objects and advantages of this invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Companies grant employee stock options (ESOs) to employees and management. These ESOs are typically fixed strike call options that are issued by the employer or company, and are subject to vesting and other restrictions. One significant restriction is that ESOs may not be resold, pledged or hedged. This restriction limits the value of ESOs and reduces the value of the ESO relative to a pure Black-Scholes or other option model value of an unrestricted option. Because ESOs are subject to vesting, are not freely tradable, and are held by less than perfectly diversified employees, those employees tend to value the ESOs at an amount that is less than the ESO might be economically worth. Further, those employees may exercise their ESOs early because they cannot sell or transfer their ESOs. This early exercise behavior is not "optimal" from a risk-neutral option valuation perspective, but is rational as employees seek to optimize their less diversified/risk averse utility.

Certain employment and managerial theories suggest that ESOs help align management and employee interests with shareholders. For example, agency theory suggests that executives are naturally risk averse and seek to keep their job thus reducing their willingness to take on risky, but positive NPV projects that shareholders actually want the executives to pursue. ESOs help keep some convexity (leveraged upside), in executive pay and aligns managerial and shareholder interests. However, because ESOs are dilutive instruments, shareholders don't want "too many" issued, rather they want to optimize incentives while minimizing dilution.

Finally, ESOs (although valued by employees) are probably valued at less than their economic worth by employee holders. Employees tend to value their options for what they would get for them by exercising them (i.e., their "intrinsic" value) and not the higher theoretical option value.

Without the invention, ESOs are granted with vesting restrictions and prohibitions on transfer. Typically the issuing company board of directors controls transferability. Limited transferability is typically allowed for employees for estate purposes (gifting or transfer of ESO to a family trust or family member). However the ESOs are still subject to vesting restrictions, and lapse rules (or if lapse rules have been removed, then claw-back provisions against the employee if they leave within a specified time period). In a small number of circumstances, some companies may allow senior executives to transfer ESOs to a "exchange fund" partnership to diversify their ESO positions.

Figure 1:
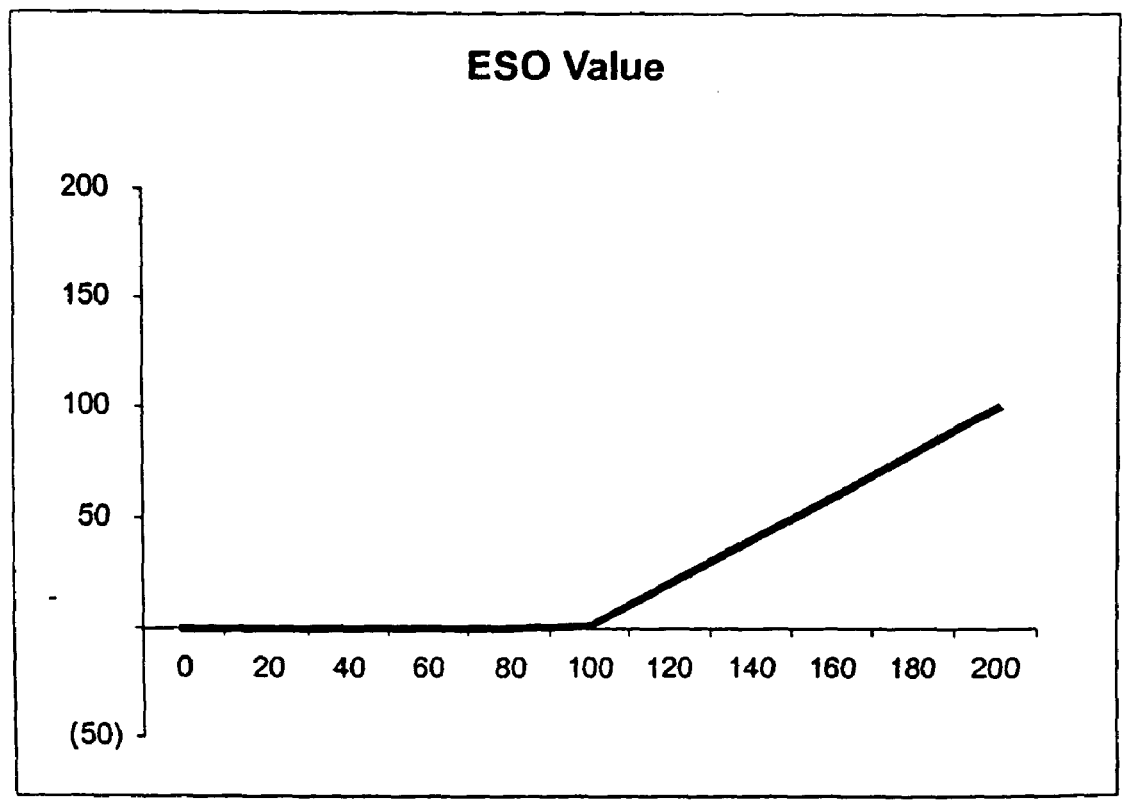
FIG. 1 illustrates valuation of an employee stock option without the invention.

Without the invention, ESOs tend to lose their incentive or motivational impact when the are "underwater" or "out-of-the-money." A stock option is underwater when the stock price is below the option exercise price. The loss in incentive results from the fact that employees can only exercise (not sell) their options, and thus when the option is underwater, it has limited or no value to the employee. Deep underwater options can be demotivating, because the likelihood of payout is quite low. Referring to FIG. 1, the value of an ESO with a strike price of $100 is illustrated with the stock price of the underlying stock on the horizontal axis. When the stock price is less than the strike price of $100, the option is underwater, and has no value upon exercise.

To address these problems, companies have attempted to manage their underwater ESO exposure by: 1) restriking down the option exercise price; 2) canceling awards and awarding new grants; 3) accelerating new grants; and 4) tendering for the underwater options (for cash or stock). However, these one-time fixes can create adverse stockholder reaction.

As indicated, although there are disadvantages with non-transferable ESOs, companies have not granted broadly transferable ESOs. One reason is that the U.S. tax code seems to suggest that granting transferable stock options is taxable upon grant. Section 83 of the U.S. tax code states that options that have "readily ascertainable fair market value" are taxable upon grant. In contrast, current tax treatment of non-transferable ESOs suggests that the grant is non-taxable and only the exercise or sale of the ESO is a taxable event. For a number of reasons, most employers and employees don't want to have the grant of the ESO to be a taxable event.

Companies do grant warrants to investors, business partners, and lenders, which are generally transferable under applicable SEC exemptions (registration, private placement, etc.). These warrants are exercisable under their terms and generally do not lapse. These warrants are sold for cash or issued as part of an exchange for goods or services.

Transferable stock options can be priced using an option pricing model and risk-neutral pricing theory. Hedging or a transfer right to a hedger is one fundamental requirement underlying these theoretical pricing models. Therefore, because known ESOs are not hedgeable nor transferable, they violate a fundamental tenant of risk-neutral valuation. The lack of transferability and required lapse upon termination of employment motivate employees to exercise their ESOs early, which is also suboptimal from a theoretical risk neutral valuation perspective.

Accounting Issues

There is a possibility that FASB will require all U.S. reporting companies to expense ESOs under FAS123 (an option valuation method). Most companies use an older method (APB 25), which allows for no expensing if the ESOs are granted with an at-the-money strike price or greater.

One problem that ESO issuer's have cited with respect to FAS123 expensing of ESOs is the difficulty of accurately valuing ESOs due to their unique design (lapse, early exercise behavior). There is no "commonly accepted method" to value ESOs other than using option pricing methodology. The models used to value options tend to be "modified Black-Scholes" or binomial models for American style options. For ESOs, because they are subject to restrictions such as lapse and lack of tradability, these option pricing models are modified in an attempt to take into account: a) the options granted that never vest are worth zero; and b) the fact that holders of ESOs exercise early and thus ESOs have shorter expected lives than their final maturity. It is generally understood that the lack of transferability and risk of lapse leads to early exercise. Early exercise effectively makes the ESO a shorter dated option. Currently, employers use historical employee retention and early exercise behavior to model the expected lives for ESOs.

Transferable ESOs, issued as described below, are easier to value because they are, in fact, transferable. This allows an issuer to use American style option pricing models without significant alteration. This is because upon vesting, the employee holds a transferable option and the value is easy to determine. Thus, employers will be able to more easily and accurately value their ESOs by amending and granting transferable ESOs. This will lead to certainty and uniformity if FAS123 expensing is mandated.

Transferable ESOs also improve compensation efficiency and allow companies to grant fewer ESOs for the same compensation effect as a larger amount of non-transferable ESOs. This leads to less absolute dilution.

Figure 2:
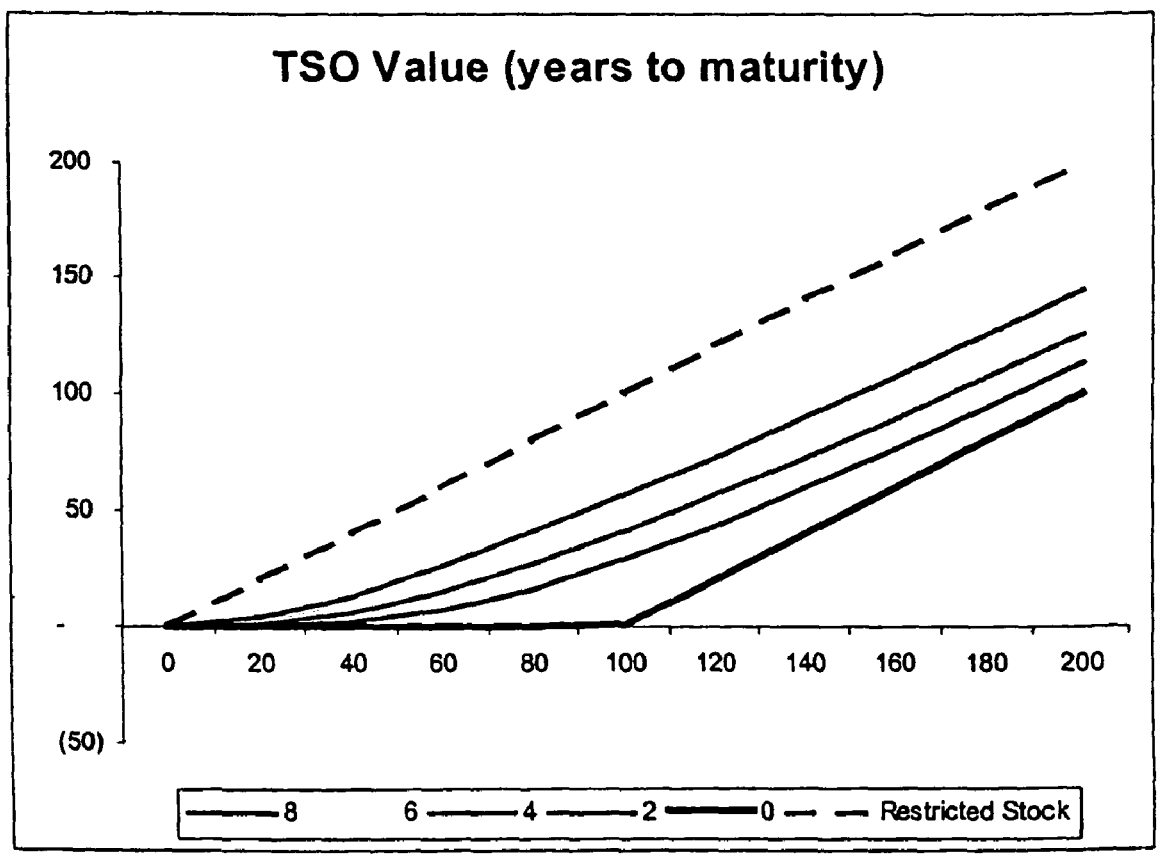
FIG. 2 illustrates valuation of an employee stock option with the invention.

Transferable ESOs also resolve problems with underwater options, and companies do not need to tender for their underwater options, restrike or exchange them. This is because the transferability feature builds in a ready bid for the options once vested or transferable. This transferability eliminates the need for the company to affect a one-time tender offer, exchange, restrike or accelerated grant. The positive effect and value of underwater transferable options is illustrated in FIG. 2.

In one embodiment of the invention, an issuing company amends their existing ESO plans to allow for transferability for certain tranches of ESOs that have already been granted. The amount available to be sold at any one time is regulated by various filters, taking into account Daily Average Trading Volume (DAV) of the underlying stock and other factors.

In one embodiment, transferability of the ESOs is restricted to one or a few designated Investment Banks.

In one embodiment, only vested ESOs can be transferred. Once transferred any lapse restrictions no longer apply.

In one embodiment, payment by the Investment Bank is in cash or in issuer shares. The Investment Bank hedges by selling short 100% of the issuer shares under an effective registration statement. The Investment Bank buys back 1-Delta amount of shares. Thereafter, the Investment Bank hedges for its own account by adjusting its hedges over time. Payments received by the employee for the transferred ESOs are net of withholding for FICA and tax withholding.

In one embodiment, transferable ESOs are more closely aligned with perceived value received by employees with economic costs given up by shareholders. Employees value the ESO closer to the Black-Scholes value since that is the price at which they can sell the ESO once the options are vested. Shareholders see ESOs as a cost equal to their Black-Scholes value.

In one embodiment, the Board of Directors approves a process that amends existing ESO plans to allow for transferability (sale by employee) to an Investment Bank.

In one embodiment, new ESOs are granted with vesting that also includes a time at which the ESO will also be transferable. Upon vesting, the employee can sell the ESO.

In one embodiment, the Investment Bank purchases the ESOs and hedges itself by shorting shares (directly to the market or partially to the employee and the market).

In one embodiment, the Investment Bank communicates to ESO plan participants over an automated quote system with point and click execution. The employee interface allows for pricing and scenarios of sale now versus sale later, not just exercise now or later.

In one embodiment, a basic option price is available for the employee to look at on the interface. If the employer seeks competitive bids from multiple Investment Banks, the employer sets up a broker/dealer under NASD registration to comply with Reg ATS under SEC rules.

In one embodiment, the system tracks all grants, strikes, maturity, and vesting for the employer. The system allows sale within an allowed window each quarter or specified period as determined by the employer (subject to company black out rules).

In one embodiment, the system interacts with a broker dealer and receives finds and disburses such funds, net of FICA and federal tax withholding, on sale proceeds. A per transaction fee is charged for use of system.

In various embodiments, the invention includes the creation of tradable ESOs; the creation of ESOs that can be hedged in the open market; the trading interface; the employee interface; and funds disbursement net of withholding on the Sale price of ESOs.

Transferable Options Address the Problems of Normal ESOs

In various embodiments, the transferable ESO of the invention aligns perceived employee value with shareholder economic costs upon grant; resolves many "underwater" or "out-of-money" option valuation and motivational issues; maintains a convex or leveraged upside payout, motivating employees more on the upside than downside; limits dilution to shareholders if stock performs poorly; allows the issuer to grant less units of options or stock compensation due to greater perceived value by employees and achieve compensation efficiency and shareholder alignment, thus limiting dilution; is not taxable upon vesting; is easy to value upon grant; and is transferable.

By making employee stock options transferable, embodiments of the instant invention eliminate the difference in the options' value as perceived by employees and corporations. This so called "value gap" is created when employees calculate the value of the stock options by determining the amount they would receive if they exercised the option and sold the underlying security; this amount is referred to as the "intrinsic value" of the option. At the same time, companies value the same options by adding their "time value" to their intrinsic value to create the options "theoretical value." Time value is the value derived from the possibility that the options underlying security will appreciate in price before the expiration of the option. With employee stock options that are transferable after a predetermined period of time, the employee, like the employer, values the option nearer its theoretical value because that is the same value the employee will realize upon its sale.

Hedging Exposure to Purchased Options

The theoretical value of a transferable stock option can be calculated using the Black-Scholes formula, binomial, trinomial, or derivations thereof. The Black-Scholes formula is a framework for pricing options. The variables used by the formula include, inter alia, the price of the stock underlying the option and the volatility of the stock. As the variables used to calculate the value of the option change, so too does the value of the option. Consequently, any third party that purchases stock options from an employee will take on the risk that the price of the underlying stock and the price of the corresponding option will change. As this exposure to price volatility can be significant, it is an obstacle to any transferable stock option plan.

An appropriate hedge is needed to remove these pricing risks. A perfect hedge would completely remove any risk resulting from changes in the price of the stock. One method to hedge employee stock options is to write call options with similar terms. While this is a theoretically correct way to hedge the employee stock options it has practical limitations. The option markets are structured such that the price and duration for options sold on them are dictated by the market themselves. In addition, the availability of longer term options is limited. Consequently, it may be cost prohibitive to sell options to hedge the employee stock option risk. In time, however, the markets may mature to the point that it is cost effective to hedge the employee stock option risk with options.

Another way in which a third party can hedge the risk associated with the price of the underlying stock is to execute what is referred to as "delta hedging." In addition to the theoretical price of an option, the Black-Scholes formula also produces delta. Delta is a measure of the sensitivity of the calculated option value to small changes in the share price. For example a delta of 0.50 indicates a half-point or 50¢ rise in premium for every dollar that the stock price rises. Delta hedging involves buying or shorting shares in an amount equal to delta multiplied by the number of options short or long respectively. When a party is long call options, as would be the case with the instant invention, it is therefore necessary to short a number of shares equal to the number of options owned times delta. The arrangement generally makes the option position immune from small changes in the price of the underlying share.

Delta changes in conjunction with the price of the shares. The sensitivity of delta to changes in the share price is quantified as gamma. As the share price and delta change correspondingly, it becomes necessary to change the number of shares long or short. This is known as "dynamic delta hedging" or "running a delta book."

Example System of the Invention

Figure 3:
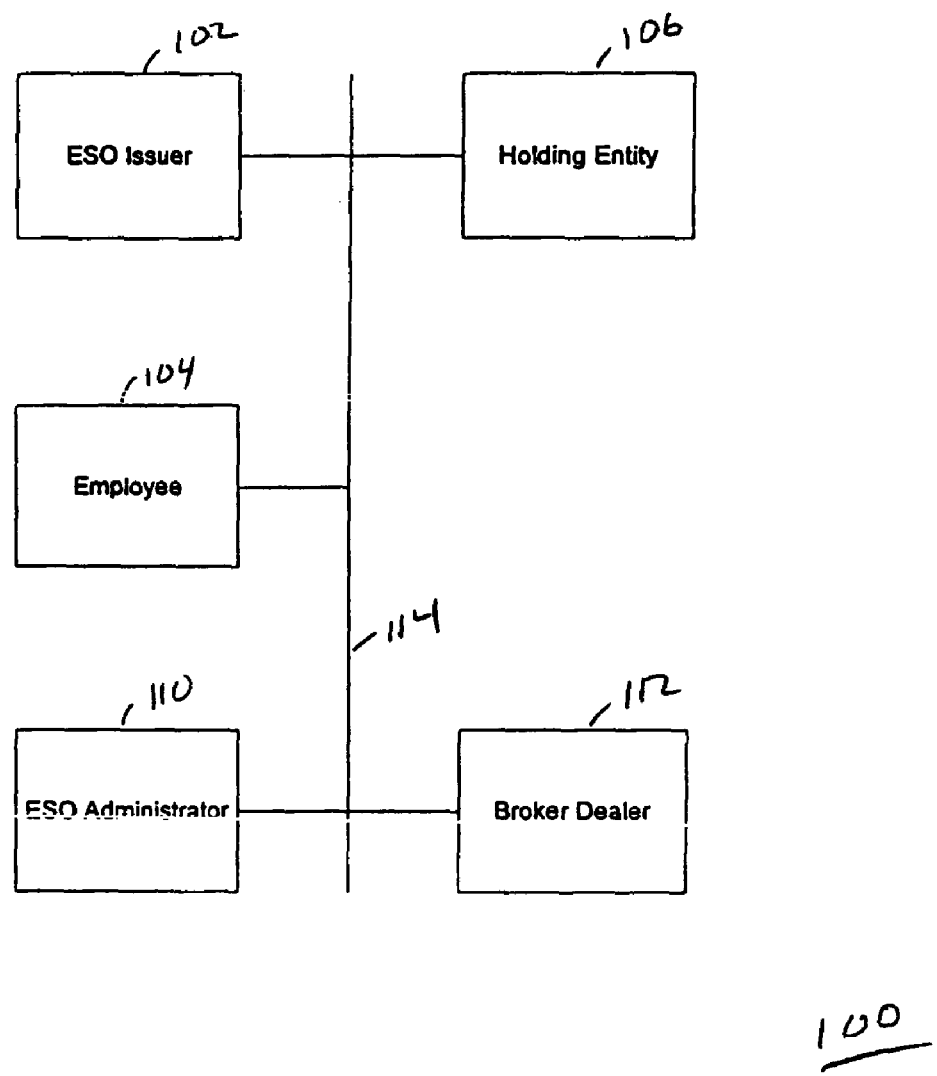
FIG. 3 illustrates an example system according to one embodiment of the invention.

Referring to FIG. 3, system 100 of the invention includes ESO Issuer 102, Employee 104, Holding Entity 106, ESO Administrator 110, and Broker Dealer 112. ESO Issuer 102, Employee 104, Holding Entity 106, ESO Administrator 110, and Broker Dealer 112 are interconnected by network 114, which may be an intranet, the Internet or other form of wired or wireless communication.

Example Methods of the Invention

Figure 4:
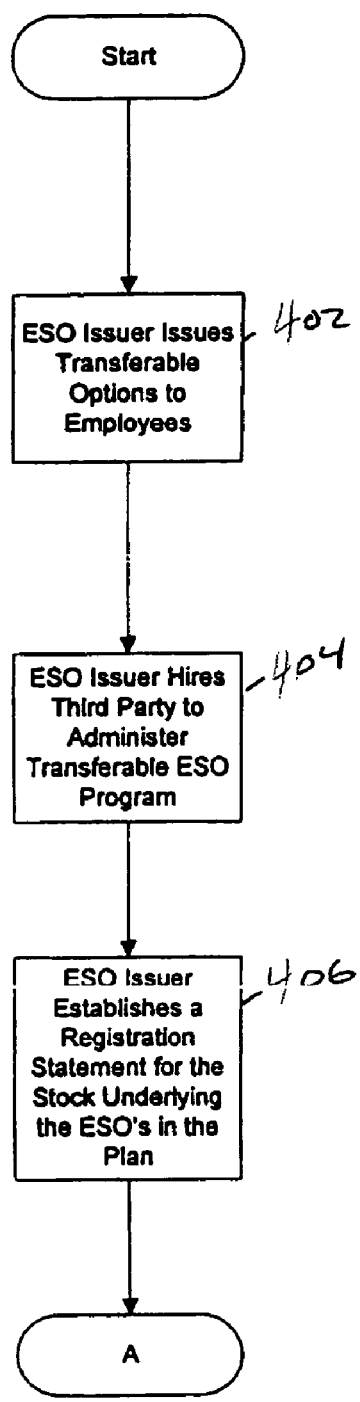
FIG. 4 illustrates steps in an example embodiment of the invention.

There are a number of different methods of the invention, and variations on those methods. One such method in various embodiments is illustrated generally in FIGS. 4 through 8. Referring to FIG. 4, at step 402, ESO Issuer 102 issues a transferable ESO to Employee 104.

At step 404, ESO Issuer 102 hires an ESO Administrator 110 to administer the transferable ESO program.

At step 406, ESO Issuer 102 establishes a registration statement for the stock underlying the ESOs in the plan.

Figure 5:
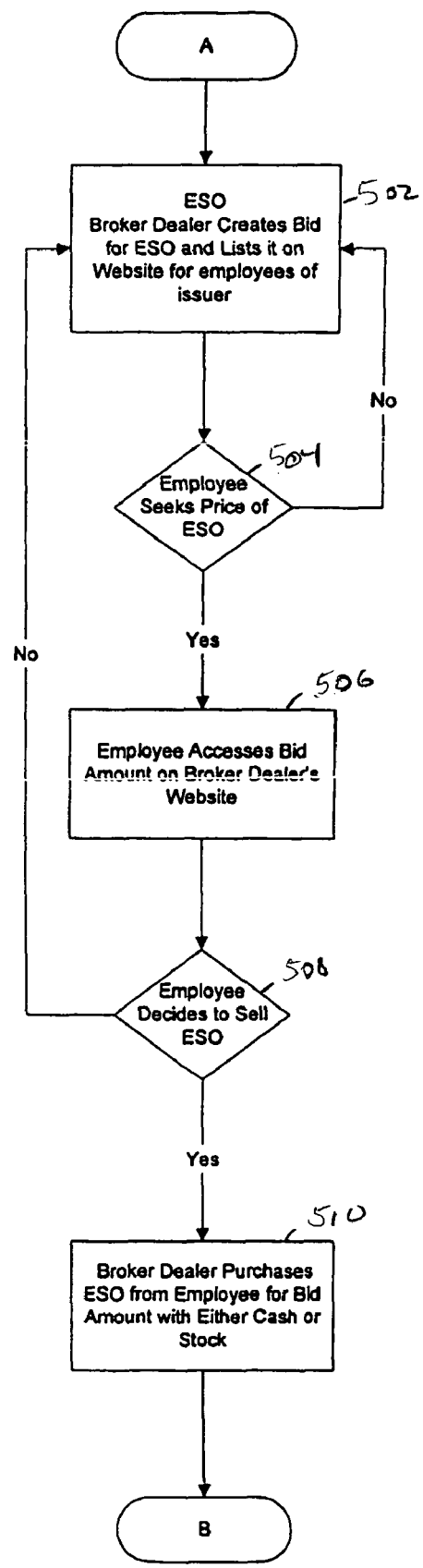
FIG. 5 illustrates steps in an example embodiment of the invention.

Referring to FIG. 5, at step 502, Holding Entity 106 through its Broker Dealer 112 creates a bid amount for the ESO and sends the bid amount to ESO Administrator 110. Bid is expressed as i) U.S. $ price; ii) formula, e.g., A+B*C, where A is U.S. $ price, B=delta, and C="change in stock price;" or iii) Grid [option prices vs. stock prices]. ESO Administrator 110 then sends the bid amount to Employee 104, or makes the bid amount available to Employee 104 on a web site.

At steps 504, 506, Employee 104 decides to check a bid amount of the ESO and accesses the bid amount on the web site.

At step 508, Employee 104, decides whether to sell the ESO.

If the Employee decides to sell the ESO, then at step 510, Broker Dealer 112 buys the ESO from Employee 104 for the bid amount with either cash or stock.

Figure 6:
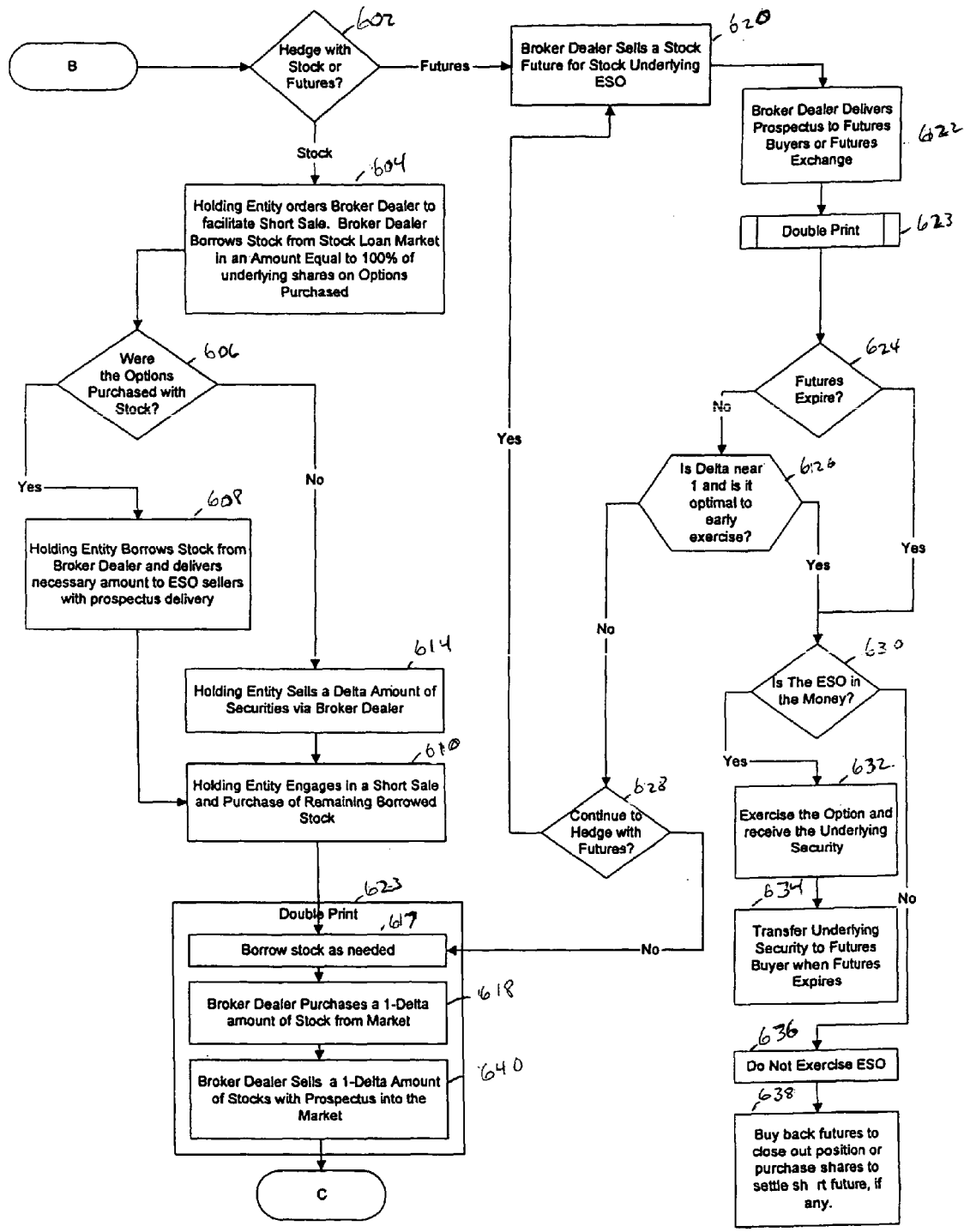
FIG. 6 illustrates steps in an example embodiment of the invention.

Referring now to FIG. 6, at step 602, system 100 determines whether to hedge with stock or with futures.

If system 100 determines to hedge with stock, then at step 604, Holding Entity 106 orders Broker Dealer 112 to facilitate a short sale by borrowing stock from the stock loan market in an amount equal to 100% of the underlying shares on options purchased.

At step 606, system 100 determines whether the ESOs were purchased with stock.

If the ESOs were purchased with stock, then at step 608, Holding Entity 106 instructs Broker Dealer 112 to deliver necessary amount to employee ESO sellers 104 with prospectus delivery.

At step 610, Holding Entity 106 engages in a short sale of remaining borrowed stock with prospectus delivery and repurchases shares as needed.

If at step 606, system 100 determines that the ESOs were not purchased with stock, then at step 614, Holding Entity 106 sells a Delta Amount of securities via Broker Dealer 112.

At step 610, Holding Entity 106 engages in a short sale and purchase of remaining borrowed stock.

At step 617, Broker Dealer 112 borrows stock as needed.

At step 618, Broker Dealer 112 purchases a 1-Delta amount of stock from the market.

At step 640, Broker Dealer 112 sells a 1-Delta amount of stocks with prospectus into the market.

The steps at 617, 618 and 640 in combination as 623 are also known as a Double Print.

If at step 602, system 100 determines to hedge with futures, then at step 620, Broker Dealer 112 sells a stock future for stock underlying the ESOs.

At step 622, Broker Dealer 112 delivers a prospectus to futures buyers or futures exchange.

At step 623, system 100 performs a Double Print, as illustrated at steps 617, 618 and 640.

At step 624, system 100 determines whether the futures have expired.

If the futures have not expired, then at step 626, system 100 determines whether Delta is near 1 and whether it is optimal to early exercise.

If Delta is not near 1 or it is not optimal to early exercise, then at step 628, system 100 determines whether to continue to hedge with futures.

If system 100 determines to continue to hedge with futures, then at step 620, Broker Dealer 112 sells a stock future for stock underlying the ESOs.

If system 100 determines not to continue to hedge with futures, then at step 617, Broker Dealer 112 borrows delta amount of stock and delivers to settle short future position equal to delta amount.

If at step 626, system 100 determines that delta is near 1 and it is optimal to early exercise, or that the ESOs have expired at step 624, then at step 630, system 100 determines whether the ESO is in the money.

If the ESO is in the money, then at step 632, Holding Entity (Hedger) 106 exercises the option and receives the underlying security.

At step 634, the underlying security is transferred to the futures exchange buyer when the futures expires as per requirements for physical delivery under futures exchange rules.

If the ESO is not in the money, then at step 636, the ESO is not exercised.

At step 638, Holding Entity (Hedger) 106 purchases futures to close out remaining short position, if any or purchase stock underlying the futures and transfers the stock to the futures buyer when the futures expire.

Figure 7:
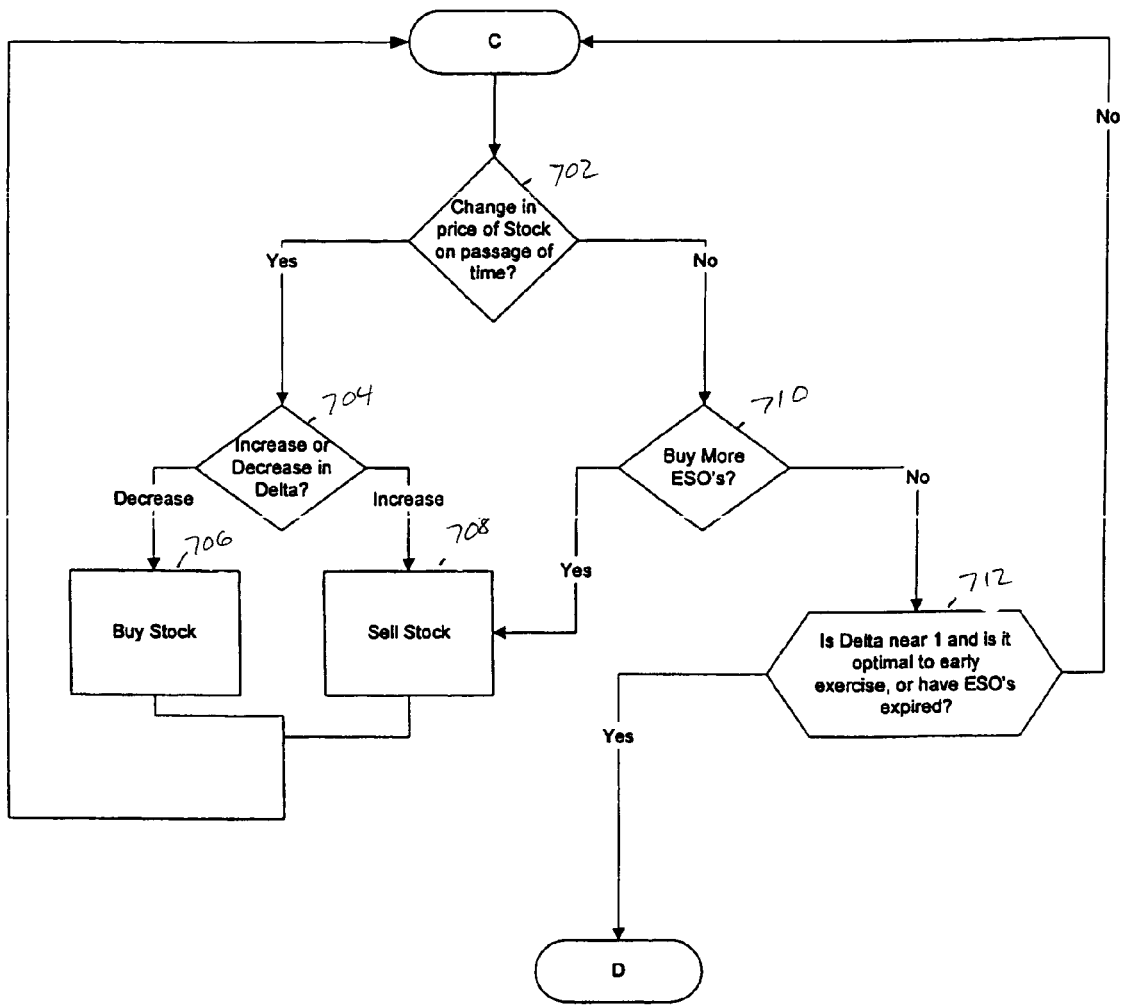
FIG. 7 illustrates steps in an example embodiment of the invention.

Referring to FIG. 7, at step 702, system 100 determines whether there has been a change in price of stock on passage of time.

If there has been a change in price of stock, then at step 704, system 100 determines whether the change was an increase or a decrease.

If the change in Delta was a decrease, then at step 706, Holding Entity (Hedger) 106 buys stock.

If the change in Delta was an increase, then at step 708, Holding Entity (Hedger) 106 sells stock.

The process of buying or selling serves to rebalance the hedge.

If at step 702 there has not been a change in price of stock, then at step 710, system 100 determines whether to buy more ESOs.

If system 100 determines to buy more ESOs, then at step 708, Holding Entity (Hedger) 106 sells stock.

If system 100 determines not to buy more ESOs, then at step 712, system 100 determines whether Delta is near 1 and it is optimal to early exercise, or whether ESO's are about to expire.

If at step 712, system 100 determines that Delta is not near 1 or it is not optimal to early exercise or the ESOs are not about to expire, then at step 702, system 100 again determines whether there has been a change in price of stock on passage of time.

Figure 8:
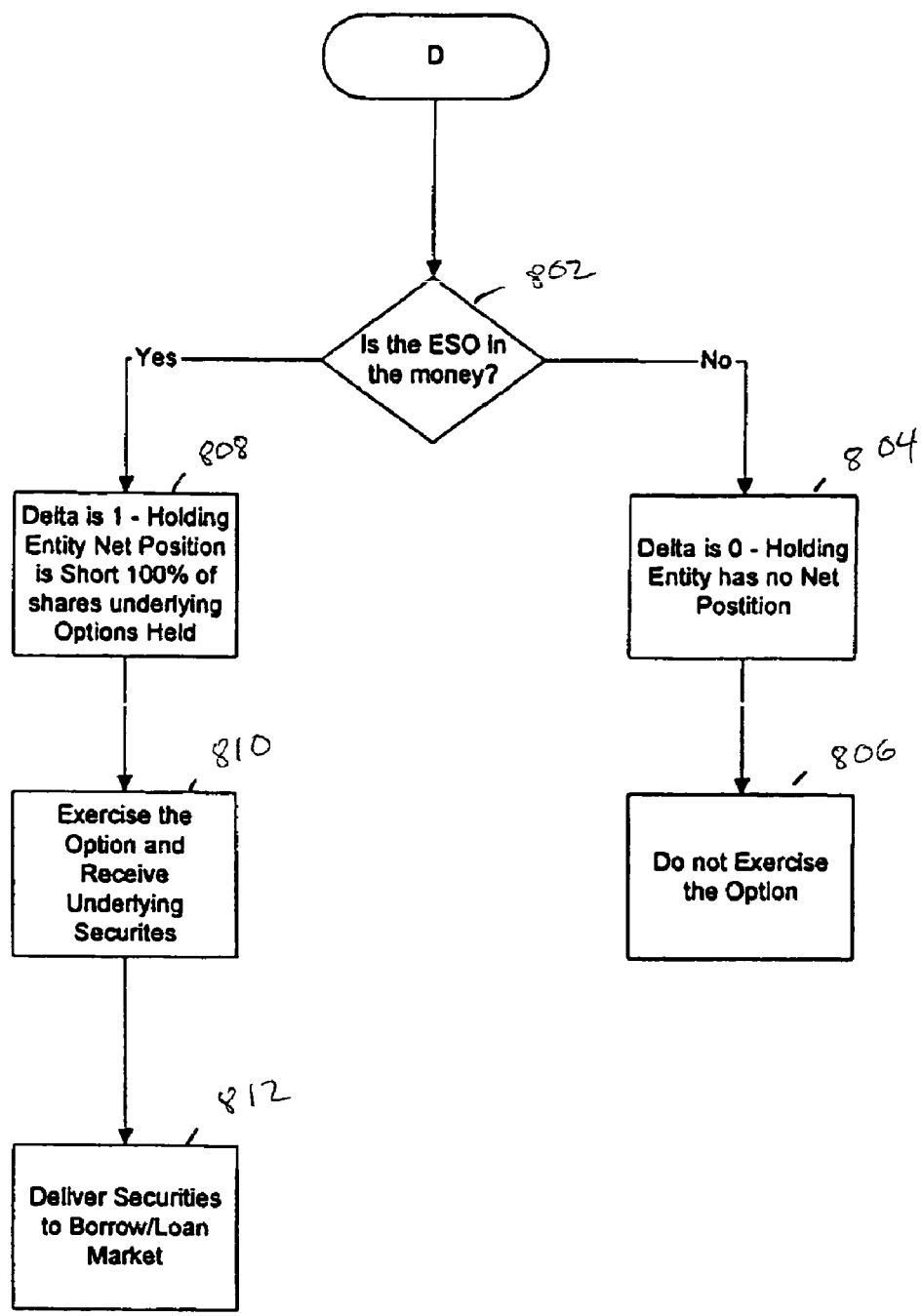
FIG. 8 illustrates steps in an example embodiment of the invention.

If at step 712, system 100 determines that Delta is near 1 and it is optimal to early exercise, or that ESOs are about to expire, then at step 802 of FIG. 8, system 100 determines whether the ESO is in the money.

If the ESO is not in the money, then at step 804, system 100 determines that the Delta is zero and Holding Entity 106 has no net position.

At step 806, Holding Entity 106 does not exercise the option.

If at step 802 system 100 determines that the ESO is in the money, then at step 808, system 100 determines that the Delta is 1, and Holding Entity 106 is short 100% of the shares underlying the options held.

At step 810, Holding Entity (Hedger) 106 exercises the option and receives the underlying securities.

At step 812, Holding Entity (Hedger) 106 delivers the securities to the lender of the securities.

In another embodiment, Holding Entity (Hedger) 106 sells shares back to ESO Issuer 102. As an example, a portion of the initial Delta can be shorted back to ESO Issuer 102.

In another embodiment, the double print at step 623 of FIG. 6 is accomplished by shorting to ESO Issuer 102 and buying back from the market to establish the 1-Delta distribution and buyback.

The process described above for transfer of the ESOs may be a one-time process, or it may be periodic, such as monthly, quarterly, semi-annually or annually, with a specified window of time each period for transfer. This allows the issuer to have an effective registration statement during the specified window of each periodic opportunity for transfer, but does not require the issuer to have an effective registration for every day of the year.

Payment to the employee can be by cash, or with shares of the issuer equal to the value of the options that they transfer. For example, if each of their options are worth 1/10 of a share, and the employee holds 100 options, they would receive 10 shares. It is believed that payment using shares of the issuer has advantages because there is no need to comply with the up-tick rule required on typical short sales in the market, if applicable.

One method and various embodiments have been illustrated in FIGS. 4 through 8 and described above. Other methods and various embodiments are illustrated in FIGS. 9 and 10, and described below.

Figure 9:
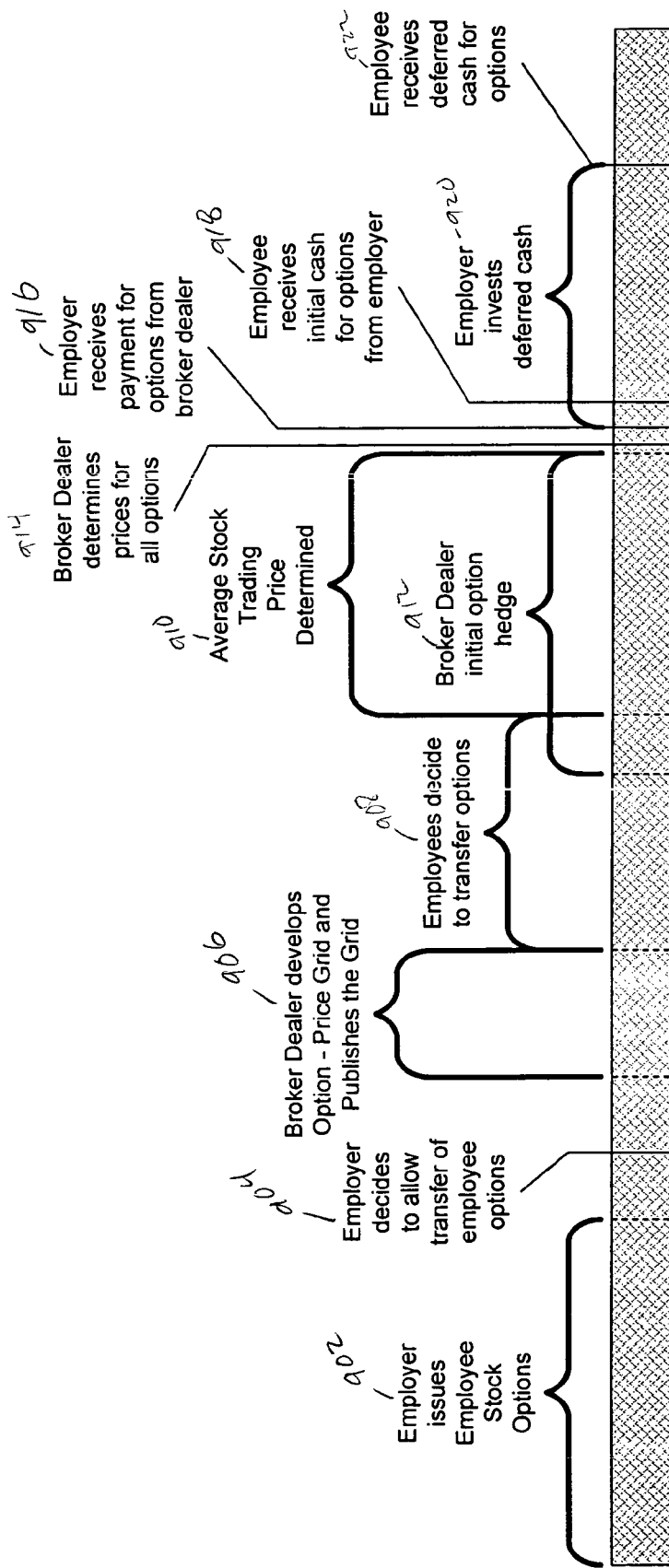
FIG. 9 illustrates steps and a time-line according to an example embodiment of the invention.
Figure 10:
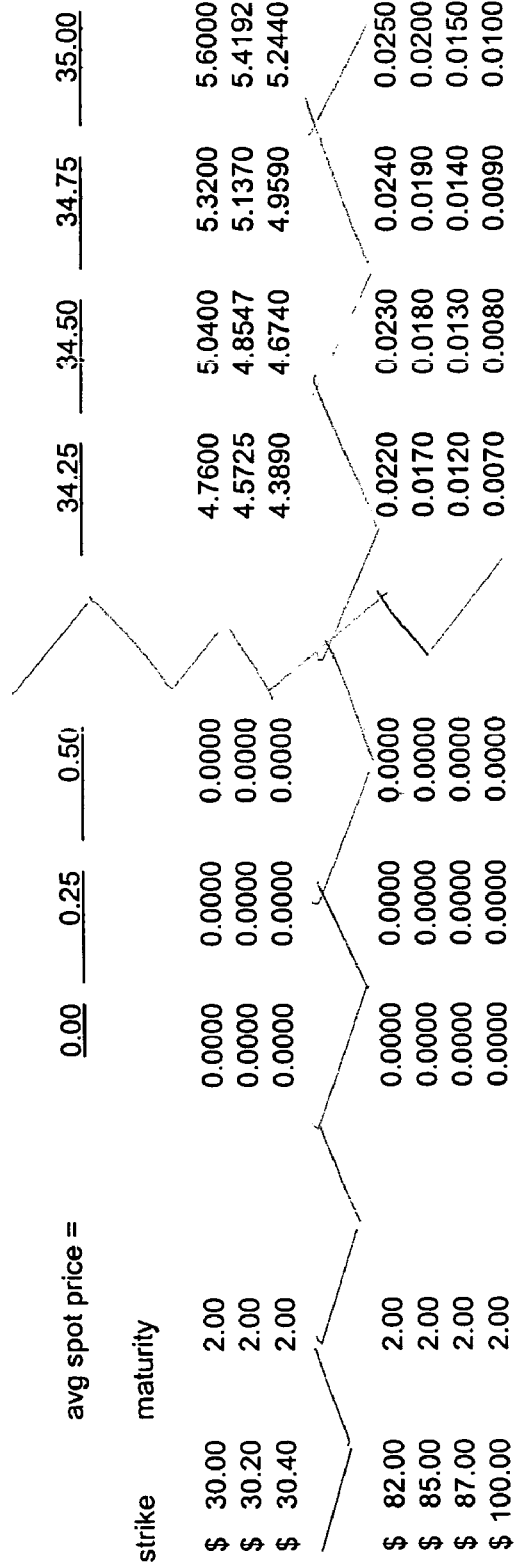
FIG. 10 illustrates an example option—price grid according to an embodiment of the invention.

Referring to FIG. 9, at step 902, an Employer or ESO Issuer 102, issues employee stock options to Employees 104. These options have the known and typical restrictions on sale, transfer or hedging.

At some point in time, at step 904, Employer 102 determines that the issued employee stock options should be transferable. There are a number of possible reason that the employer may want to do this, including underwater options.

Employer 102, working with Broker Dealer 112 determines which options will be transferable, and at step 906, Broker Dealer 112 develops an option—price grid for the options.

FIG. 10 illustrates an example of such an option—price grid. In the illustrated grid, option strike prices for options with a two year maturity are listed on one axis (vertical), with an average stock trading price on the other axis (horizontal). At the intersection of each strike price and average stock trading price, an option value price is indicated. The average stock trading price is an average of the stock price over a predetermined period of time, such as the closing stock price over a 30 day period (referred to here as an averaging period). For example, if the average closing stock trading price over a 30 day period is determined to be $34.50, and the employee holds options with a strike price of $30.20, and two year maturity, then if they decide to transfer their options, the price they will receive for each option is $4.8547. As FIG. 10, illustrates, there are some options that will not have any value if the average closing stock trading price is too low. Similarly, if the option strike price is very high, in comparison to the average closing stock price, the price the employee will receive for their options will be lower.

Referring again to FIG. 9, once Broker Dealer 112 develops the option-price grid or grids, they publish or make the grid available to Employees 104 at step 906.

At step 908, Employees 104 have access to the option-price grid and during a predetermined period of time (referred to here as a decision period), they are able to make a decision on whether to transfer their options. If Employees 104 do not know the strike price or maturity of the options that they hold, they can get this information from ESO Administrator 110. Using the strike price and maturity of the options that they hold, and the option-price grid, Employees 104 can determine the range of possible prices that they might receive for their options. Employees 104 will not know the exact prices they will receive until the end of the averaging period, and they must make a decision on transfer of their options before the end of the decision period, which is before the start of the averaging period.

If Employee 104 decides to transfer their options, they inform ESO Administrator 110 during the decision period (step 908), and ESO Administrator 110 informs Broker Dealer 112 of the decision, including the number of options held by the Employee, the strike price and the maturity. This information is used by Broker Dealer 112 in their hedging of the options. Employee 104 also transfers their options to ESO Issuer.

At the end of the decision period (step 908), the stock price averaging period (step 910) begins. During the averaging period, the stock trading price is determined and at the end, an average value over the period is determined. During the averaging period, ESO Issuer also amends the options as necessary to allow transfer of the options to Broker Dealer 112 after the end of the averaging period.

At step 912, Broker Dealer 112 begins the initial option hedge. As illustrated, this initial hedging period may begin before the end of the decision period (step 908), and typically extends until at least the end of the averaging period (step 910). Although not illustrated, the initial hedging period may extend beyond the averaging period (step 910).

The actual hedging techniques may be the same or similar to the techniques that are illustrated in FIGS. 6-8, and described above, or they may be variations of those techniques. One difference from the techniques illustrated in FIG. 6 is that if Employee 104 exchanges the options for cash, then steps 606, and 608 of FIG. 6 are not necessarily applicable.

At step 914, after the end of the averaging period, Broker Dealer 112 determines the average closing stock trading price, and from that average closing stock trading price, determines the prices for the options that Employees 104 have decided to transfer. This information is used by ESO Administrator 110 and ESO Issuer 102 to determine the cash payments to each Employee 104, who elected to transfer their options. This information is also used by Broker Dealer 112 to determine the necessary payment to ESO Issuer 102 for the options.

At step 916, ESO Issuer 102 receives the payment from Broker Dealer 112 and in exchange, ESO Issuer transfers the amended options to Broker Dealer 112.

At step 918, Employee 104 receives an initial payment for the options that they transferred to ESO Issuer 102. Typically, this is a portion of the value they will receive for their options, such as one third. The timing for this payment may be immediately after the value of the options is determined, or it may be the next scheduled payroll date, with the payment added to the employee's pay.

In steps 916 and 918 above, ESO Issuer 102 receives payment from Broker Dealer 112, and then Employee 104 receives a payment from ESO Issuer 102. However, this order may be reversed, with Employee 104 receiving payment from ESO Issuer 102 and then ESO Issuer 102 receives payment from Broker Dealer 112, in exchange for the amended options. Payments to Employee 104 are subject to applicable tax withholding, if any.

At step 920, ESO Issuer 102 holds the remaining portion of the value for Employee 104 until the option maturity date or some other predetermined time. During the holding period, the value is typically invested, with the Employee receiving any increase in value of the investment. Alternatively, ESO Issuer 102 may merely use the proceeds for general corporate purposes and accrue an investment rate on the notional amount deferred.

At step 922, Employee 104 receives the deferred portion of the value, plus any increase in value from investment.

Following transfer of the options to Broker Dealer 112, Broker Dealer 112 may determine that additional hedging is required.

In the discussion immediately above, reference has been made almost exclusively to Broker Dealer 112 with little or no mention of Holding Entity 106. This is to simplify the discussion and interactions of this method and various embodiments. However, it may be necessary, for regulatory or other purposes for independent entities to perform certain steps, and in that case, some of the steps that have been described as being performed by Broker Dealer 112 would be performed by Holding Entity 106.

In some jurisdictions, deferred payments may not be allowed, or tax withholding is applied to the entire payment even if deferred. For these and other reasons, Employee 104 may receive the entire value at one time.

If or when ESO Issuer 102 amends the options, they may change terms of the options, such as maturity, number of shares per option and ISDA based dilution or dividend protection.

Figure 11:
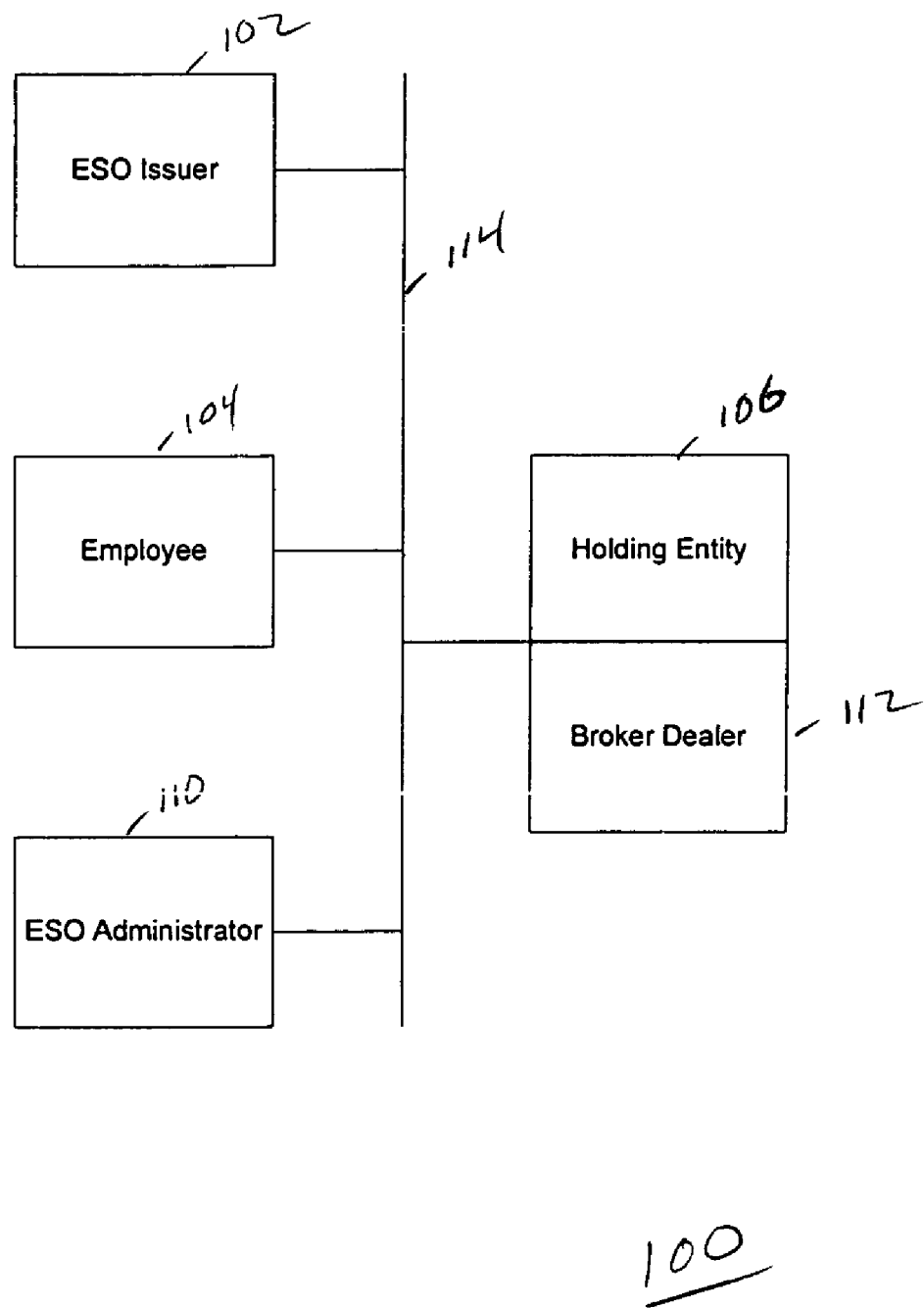
FIG. 11 illustrates an example system according to one embodiment of the invention.

Finally, the system illustrated in FIG. 3 shows Holding Entity 106 and Broker Dealer 112 as separate entities. It is also possible, as illustrated in FIG. 11, for Holding Entity 106 and Broker Dealer 112 to be associated with each other, or parts of the same entity.

Although illustrative embodiments have been described herein in detail, it should be noted and will be appreciated by those skilled in the art that numerous variations may be made within the scope of this invention without departing from the principles of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method implemented by a programmed computer for transfer of employee stock options, the method comprising:
   providing, using the programmed computer, a plurality of option value prices;
   facilitating, using the programmed computer, transfer of ownership of an employee stock option from an employee holding the employee stock option to an issuer of the employee stock option without exercising the employee stock option;
   determining, using the programmed computer, a stock trading price corresponding to a particular one of the plurality of option value prices;
   providing, using the programmed computer, a value to the employee corresponding to the particular one of the plurality of option value prices in exchange for the transfer of ownership of the employee stock option from the employee;
   amending, using the programmed computer, the employee stock option without exercising the employee stock option;
   transferring, using the programmed computer, the amended stock option to the third party without exercising the amended stock option; and
   receiving, using the programmed computer, a value from the third party corresponding to the amended stock option in exchange for transferring the amended stock option to the third party.

2. A method according to claim 1, wherein providing a plurality of option value prices uses an option pricing formula.

3. A method according to claim 2, wherein the option pricing formula is selected from the group consisting of Black-Scholes, binomial and trinomial methods.

4. A method according to claim 1, wherein providing a plurality of option value prices provides the plurality of prices in an option-price grid.

5. A method according to claim 1, wherein determining a stock trading price further comprises determining an average stock trading price over a predetermined period of time.

6. A method according to claim 1, wherein providing a value further comprises:
   providing a first value to an employee; and
   providing a second value to the employee, wherein the first and second values are provided at different times.

7. A method according to claim 6, further comprising:
   determining an investment value corresponding to the second value; and
   providing the investment value to the employee with the second value.

8. A method according to claim 1, wherein amending the employee stock option comprises:
   amending the maturity;
   amending the number of shares per option;
   amending the dilution protection; or
   amending the dividend protection.

9. A method according to claim 1, further comprising registering an offering of securities underlying the employee stock option.

10. A method according to claim 1, further comprising issuing the employee stock option.

11. A method according to claim 1, further comprising hedging the amended stock option.

12. A method according to claim 11, wherein hedging the amended stock option includes short selling of securities and/or futures contacts.

13. A method according to claim 11, wherein hedging the amended stock option includes buying and selling securities that underlie the amended stock option.

14. A method according to claim 11, wherein hedging the employee stock option includes buying and selling of securities that underlie the employee stock option to rebalance the hedge position.

15. A method according to claim 1, wherein an issuer of the employee stock option receives the employee stock option and provides the value.

16. A method according to claim 1, wherein an issuer of the employee stock option amends the employee stock option, transfers the amended stock option and receives the value.

17. A method implemented by a programmed computer for transfer of employee stock options, the method comprising:

providing, using the programmed computer and an option pricing formula, a plurality of option value prices arranged in an option-price grid;

facilitating, using the programmed computer, transfer of ownership of an employee stock option from an employee holding the employee stock option to an issuer of the employee stock option without exercise of the employee stock option;

determining, using the programmed computer, an average stock trading price over a predetermined period of time, the average stock trading price corresponding to a particular one of the plurality of option value prices;

in exchange for the transfer of ownership of the employee stock option, providing, using the programmed computer, a first value, a second value and an investment value to the employee, the first and second values corresponding to the particular one of the plurality of option value prices, the first value provided to the employee at a first time, the second value and the investment value provided to the employee at a second time;

amending, using the programmed computer, the employee stock option to modify:
  terms of the maturity;
  terms of the number of shares per option;
  terms of the dilution protection; or
  terms of the dividend protection;

transferring, using the programmed computer, the amended stock option to a third party without exercising the amended stock option; and receiving, using the programmed computer, a value from the third party in exchange for transfer of the amended stock option.

18. A computer-readable medium having computer executable software code stored thereon, the code for transfer of employee stock options, the code comprising:
  code to automatically provide a plurality of option value prices;
  code to automatically facilitate transfer of ownership of an employee stock option from an employee holding the employee stock option without exercising the employee stock option;
  code to automatically determine a stock trading price corresponding to a particular one of the plurality of option value prices;
  code to automatically provide a value to the employee corresponding to the particular one of the plurality of option value prices in exchange for the transfer of ownership of the employee stock option from the employee;
  code to automatically amend the employee stock option;
  code to automatically transfer the amended stock option to a third party; and
  code to automatically receive a value from the third party corresponding to the amended stock option in exchange for transferring the amended stock option to the third party.

19. A programmed computer for transfer of employee stock options, comprising:
  a memory having at least one region for storing computer executable program code; and
  a processor for executing the program code stored in the memory, wherein the program code comprises:
  code to automatically provide a plurality of option value prices;
  code to automatically facilitate transfer of ownership of an employee stock option from an employee holding the employee stock option without exercising the employee stock option;
  code to automatically determine a stock trading price corresponding to a particular one of the plurality of option value prices;
  code to automatically provide a value corresponding to the particular one of the plurality of option value prices in exchange for the transfer of ownership of the employee stock option from the employee;
  code to automatically amend the employee stock option;
  code to transfer the amended stock option to a third party; and
  code to automatically receive a value from the third party corresponding to the amended stock option in exchange for transferring the amended stock option to the third party.

20. A computer-readable medium having computer executable software code stored thereon, the code for transfer of employee stock options, the code comprising:
  code to automatically provide a plurality of option value prices arranged in an option-price grid using an option pricing formula;
  code to automatically facilitate transfer of ownership of an employee stock option without exercise of the employee stock option;
  code to automatically determine an average stock trading price over a predetermined period of time, the average stock trading price corresponding to a particular one of the plurality of option value prices;
  code to automatically provide a first value, a second value and an investment value to the employee in exchange for the transfer of ownership of the employee stock option, the first and second values corresponding to the particular one of the plurality of option value prices, the first value provided to the employee at a first time, the second value and the investment value provided to the employee at a second time;
  code to automatically amend the employee stock option, without exercise, to modify:
    terms of the maturity;
    terms of the number of shares per option;
    terms of the dilution protection; or
    terms of the dividend protection;
  code to automatically transfer the amended stock option to a third party without exercising the amended stock option; and
  code to automatically receive a value from the third party in exchange for transfer of the amended stock option to the third party.

21. A programmed computer for transfer of employee stock options, comprising:
  a memory having at least one region for storing computer executable program code; and
  a processor for executing the program code stored in the memory, wherein the program code comprises:
  code to automatically provide a plurality of option value prices arranged in an option-price grid using an option pricing formula;
  code to automatically facilitate transfer of ownership of an employee stock option from an employee holding the employee stock option without exercise of the employee stock option;
  code to automatically determine an average stock trading price over a predetermined period of time, the average stock trading price corresponding to a particular one of the plurality of option value prices;
  code to automatically provide a first value, a second value and an investment value to the employee in exchange for the transfer of ownership of the employee stock option, the first and second values corresponding to the particular one of the plurality of option value prices, the first value provided to the employee at a first time, the second value and the investment value provided to the employee at a second time;

code to automatically amend the employee stock option, without exercise, to modify:

terms of the maturity;

terms of the number of shares per option;

terms of the dilution protection; or terms of the dividend protection;

code to automatically transfer the amended stock option to a third party without exercising the amended stock option; and code to automatically receive a value from the third party in exchange for transfer of the amended stock option to the third party.

\* \* \* \* \*